C. V. BATES.
PILOT LAMP MECHANISM FOR AUTOMOBILES.
APPLICATION FILED JAN. 19, 1916.

1,280,945.

Patented Oct. 8, 1918.
3 SHEETS—SHEET 1.

Witnesses:
Arthur W. Carlson
Robert T. Irwin

Inventor
Clifford V. Bates
James R. Offield Atty

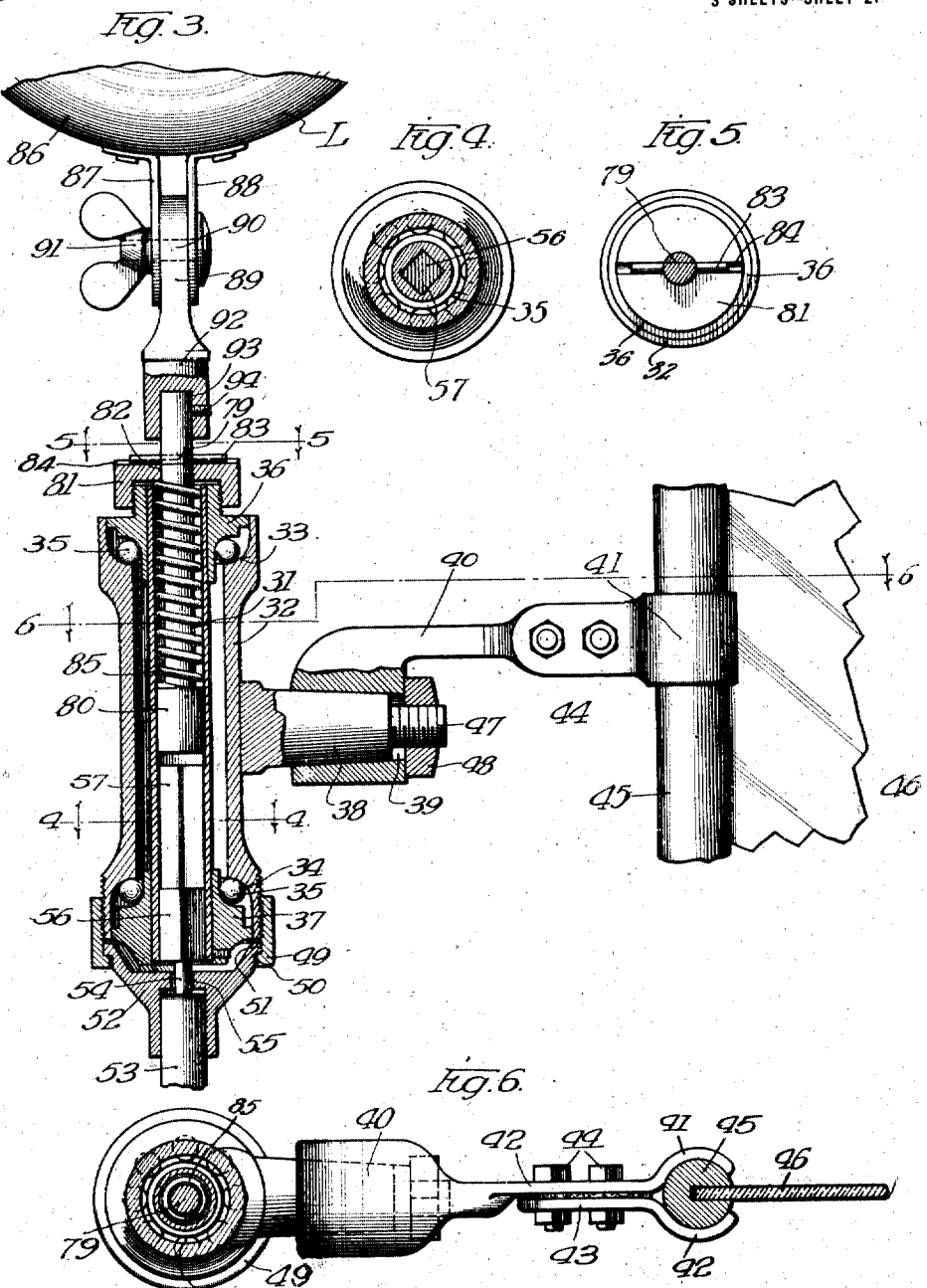

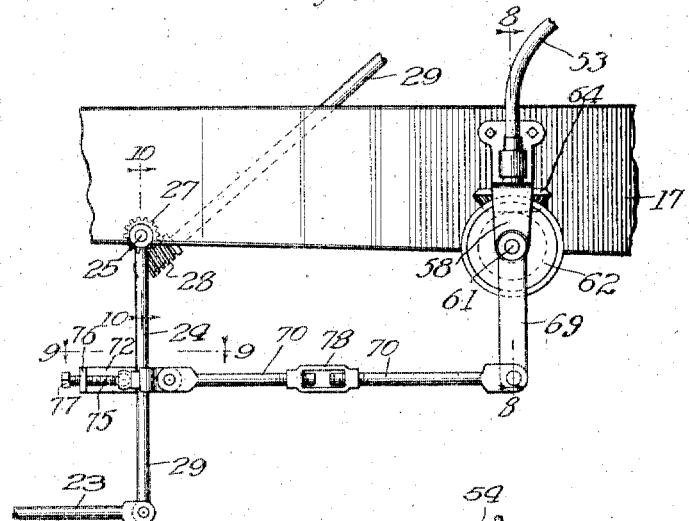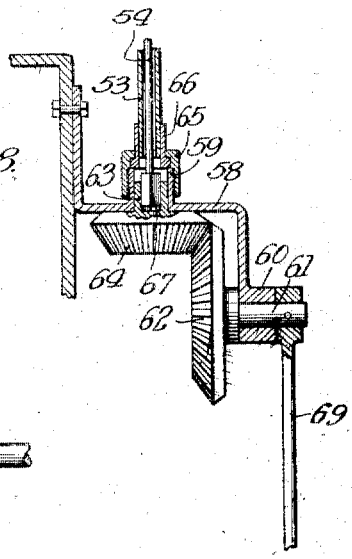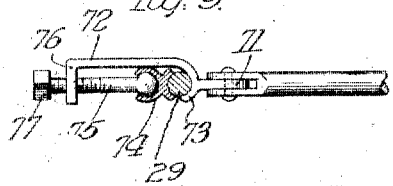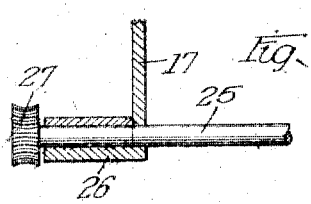

UNITED STATES PATENT OFFICE.

CLIFFORD V. BATES, OF CHICAGO, ILLINOIS.

PILOT-LAMP MECHANISM FOR AUTOMOBILES.

1,280,945.	Specification of Letters Patent.	Patented Oct. 8, 1918.

Application filed January 19, 1916. Serial No. 72,889.

*To all whom it may concern:*

Be it known that I, CLIFFORD V. BATES, a citizen of the United States, and a resident of Chicago, in the county of Cook and State of Illinois, have invented certain new and useful Improvements in Pilot-Lamp Mechanism for Automobiles, of which the following is a specification.

My invention relates to pilot lamp mechanism for automobiles and contemplates improved construction and arrangement which is more desirable and efficient.

Head lights have been affixed to the front end of motor vehicles to swing horizontally and have been connected with the steering mechanism of the vehicle to swing with the steering wheels. However, such lamps are heavy and when thus pivoted they will be subjected to severe jarring, jolting and strain owing to the vibration of the vehicle over roads and the continuous operation of the steering mechanism. Such dirigible head lights have therefore been practically abandoned and lighter pilot lamps have been adopted and secured to the wind shield frame or elsewhere to be accessible to the driver. However, such pilot lamps have been thus far adapted only for manual adjustment and swing and have not been connected with the steering mechanism for automatic control.

The object of my invention is to provide a small, light and durable pilot lamp adapted to be mounted at the edge of a wind shield for swing about a vertical axis and connected with the steering mechanism to swing horizontally with the wheels. The lamp body itself is also adapted to be manually swung in vertical planes and another object is to provide improved means for enabling disconnection of the lamp body from the driving train connected with the steering mechanism in order that the lamp may be readily and quickly adjusted manually either vertically or horizontally independently of the steering mechanism and to be quickly re-connected with the driving train after independent manual operation no matter in what position the steering mechanism may be.

The various features of my invention are clearly disclosed on the accompanying drawing in which—

Figure 1:
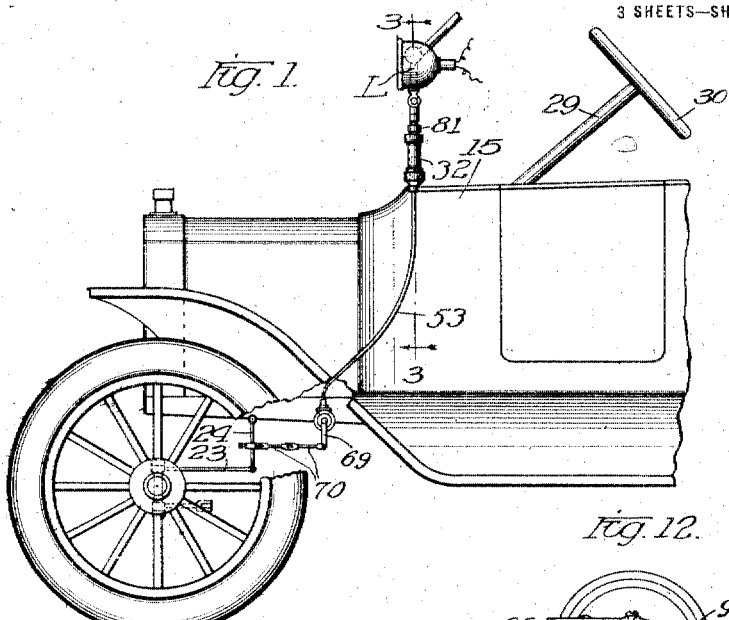
Figure 12:
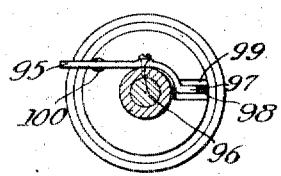
Figure 2:
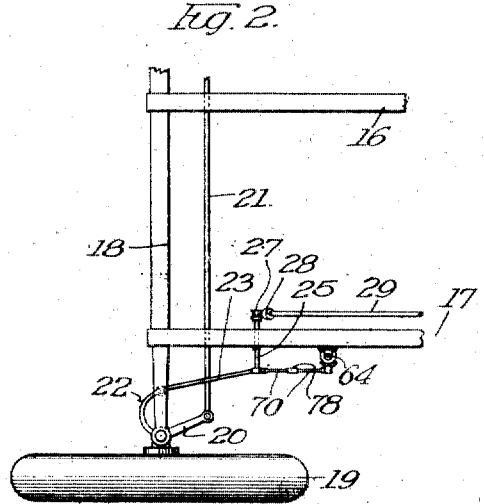
Figure 11:
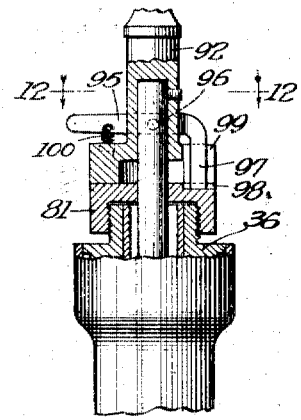

Figure 1 is a side elevational view of the front end of an automobile with part of the wheel and fender broken away, Fig. 2 is a plan view of the front end of the automobile frame showing the connection of the automatic pilot lamp controlling mechanism with the steering mechanism, Fig. 3 is an enlarged diametral sectional view on plane 3—3, Fig. 1, Fig. 4 is a sectional view on plane 4—4, Fig. 3, Fig. 5 is a sectional view on plane 5—5, Fig. 3, Fig. 6 is a plan view from plane 6—6, Fig. 3, Fig. 7 is an enlarged side elevational view showing the connection of the lamp driving train with the vehicle steering mechanism, Fig. 8 is sectional view on plane 8—8, Fig. 7, Fig. 9 is a sectional view on plane 9—9, Fig. 7, Fig. 10 is a sectional view on plane 10—10, Fig. 7, Fig. 11 is a view partly in section showing a modified releasable connection between the lamp structure and the driving train, and Fig. 12 is a sectional view on plane 12—12, Fig. 11.

Referring to Figs. 1 and 2, 15 represents the body of an automobile supported on the frame side beams 16 and 17. 18 represents the front axle and 19 represents one of the front steering wheels pivoted to the axle by the knuckle frame 20 the inner arm of which is connected by rod 21 with the knuckle frame supporting the other wheel (not shown). Extending from the knuckle frame 20 is a lever arm 22 connected by link 23 with the lower end of a rocker arm 24 which is secured at its upper end to a shaft 25 extending through the bearing 26 provided on the side beam 17, the shaft at its inner end carrying a worm wheel 27 with which meshes the worm 28 on the lower end of a steering post 29 controlled by the steering hand wheel 30. When this hand wheel is turned the vehicle steering wheels will swing in a manner well understood to guide the vehicle.

Describing now the pilot lamp mechanism, the lamp structure L is supported to turn with a vertical coupling tube 31 rotatable within a sleeve 32. The upper and lower ends of this sleeve are formed to provide bearing cups 33 and 34 repectively for bearing balls 35, companion cone structures 36 and 37 being secured to the upper and lower ends of the tube 31 respectively. Extending laterally from the sleeve 32 is a conical lug 38 which fits in a horizontal socket 39 at the outer end of the supporting arm 40. This arm 40 has the inner arcuate clamping end 41 for coöperating with a similar end 42 of the plate 43 which is secured to the arm 40 by bolts 44. The ends 41 and 42 clamp between them the cylindrical side frame 45 of the wind shield 46. The lug 38 has the threaded neck 47 for receiving the nut 48. By means of the engagement of the arcuate ends 41 and 42 with the cylindrical frame 45 the arm 40 can be adjusted horizontally, and by the engagement of the lug 38 in the socket 39 the sleeve 32 can be rotated and adjusted in a vertical plane and secured in adjusted position by tightening of the nut 48.

The lower end of sleeve 32 is threaded to receive the coupling ring 49 whose flange 50 receives the flange 51 of the coupling head 52 to securely clamp the head to the sleeve 32. The head is secured to the upper end of the sheath 53 which contains the flexible shaft 54, this shaft extending through opening 55 in the head and terminating in the polygonal end 56, the lower end of the tube 31 being correspondingly polygonal (as indicated at 57 Fig. 4) to receive the end 56 so that upon turning of the flexible shaft the tube will turn therewith.

To the rear of the rocker arm 29 connected with the steering mechanism, a bracket 58 is secured to the side beam 17 and has the upper vertical bearing sleeve 59 and the lower horizontal bearing sleeve 60. Journaled in the sleeve 60 is the stub shaft 61 to whose inner end is secured the bevel gear 62. Journaled in the sleeve 59 is the hub 63 extending from the bevel gear 64 which meshes with the gear 62. The sleeve 59 is externally threaded to receive the coupling ring 65 which locks the coupling end 66 to the sleeve, and in this coupling end the lower end of the flexible shaft sheath 53 is secured, the lower end of the flexible shaft 54 having the polygonal end 67 engaging in the polygonal pocket 68 in the hub 63.

Secured at its upper end to the outer end of the stub shaft 61 is the arm 69 to whose lower end is pivoted the rear end of link 70. The front end of this link is bifurcated to pivotally receive the lug 71 extending from the clamp frame 72. This clamp frame has the concave base 73 for receiving the rocker arm 29 and a clamping member 74 is brought against the opposite side of the rocker arm by means of a screw 75 which threads through the head 76 of the frame 72, the screw having a polygonal head 77 for receiving a wrench. The engagement of the link 70 with the rocker arm 29 is thus adjustable and in order to adjust the length of the link 70 the link is in two sections connected by turn buckle 78. With the arrangement thus far described, when the steering hand wheel 30 is turned the rocker arm 29 will swing and through link 23 the motion will be transmitted to the steering knuckles of the vehicle steering wheels, and at the same time arm 69 will swing with the arm 29 and gear 62 will be rotated to effect rotation of gear 64 and the flexible shaft 52, such turning of the flexible shaft being communicated to the tube 31 and to the lamp structure L mounted on said tube, the lamp structure swinging in the same direction as the wheels so that the light from the lamp will be correspondingly directed. By adjusting the connection of the link 70 with the rocker arm 29 the angles of swing of the lamp will be the same as the angles of swing of the vehicle wheels or will be greater or less.

Referring to Figs. 1, 3 and 5, a cylindrical stem 79 extends into the upper end of tube 31 and has the cylindrical enlargement 80 at its lower end snugly but rotationally fitting in the upper cylindrical end of the tube. The guide cap 81 has screw-threaded engagement with the upper cone structure 36 and has the guide passageway 82 for the stem. A pin 83 extends through the stem for engagement with the top of the cap 81 and the diametral detent slot 84 in the cap top. Encircling the stem 79 between the enlarged lower end 80 and the cap 81 is a compression spring 85, this spring tending to hold the stem in the slot 84 or against the smooth top of the cap. If the pin is in the slot the stem will turn with the tube 31 as the steering mechanism is turned, but when the stem is raised against the spring to carry the pin out of the slot the stem can be rotated independently of the tube to enable horizontal swing of the lamp structure independently of the steering mechanism.

Depending from the lamp shell or housing 86 are two ears 87 and 88 between which the flat head 89 is received and held by a bolt 90 which has the wing nut 91. The head 89 extends from the base 92 which has the socket 93 for receiving the upper end of the stem 79, a set screw 94 being provided to lock the base to the stem. Rotation of the stem is thus transmitted to the lamp housing, and by sufficiently loosening the wing nut 90 the lamp housing can be swung in a vertical plane on the pivot bolt 90. Usually the wing nut is tightened just sufficiently to prevent displacement in a vertical plane of the lamp while the lamp is rotating in a horizontal plane during steering of the vehicle but to permit the lamp to be readily manually adjusted vertically when desired. By lifting the lamp a short distance to raise the detent pin 83 out of detent notch 84, it can then be readily manually rotated about its vertical axis independently of the steering mechanism, and then when the lamp is rotated manually to bring the pin back into the slot re-connection will be established and the lamp will again follow the steering mechanism. This ability to readily and quickly disassociate the lamp from the steering mechanism in order that it may be manually independently rotated horizontally and to quickly reconnect it with the steering mechanism forms one of the important features of my invention as it will enable the lamp to be quickly available for spot-light purposes through a wide sweep both horizontally and vertically. With such efficient pilot lamp head lights will not be necessary on the vehicle. Furthermore, the lamp itself being very small and light it will without strain thereto accurately follow all movements of the steering mechanism and it will not be affected by the jarring or jolting of the vehicle.

In Figs. 11 and 12 I have shown a somewhat modified arrangement for disconnecting the lamp from the steering mechanism. As shown, a lever 95 is pivoted to the side of the base 92 by a screw 96 and its down-turned inner end 97 coöperates with a notch 98 in the top of the cap 81, the end 97 extending through a slot 99 in the base 92, this base being extended into engagement with the cap. Between the outer end of the lever 95 and the base is interposed a compression spring 100 which tends to swing the lever to hold its end 97 securely in the notch 98 to thus normally lock the base 92 and the lamp structure to the ball bearing cone structure 36 and thus to the tube 31 which is connected with the steering mechanism. When it is desired to release the lamp for independent rotation the outer end of lever 95 is depressed to withdraw the end 97 from the notch 98. It is of course evident that other connections may be used for adapting disconnection of the lamp structure for manual rotation independently of the steering mechanism. Other arrangements may also be used. I do not therefore desire to be limited to the arrangements shown.

Having described my invention, I desire to secure the following claims:

1. The combination with the body, steering wheels and steering mechanism of a motor vehicle, of a sleeve secured adjacent the driver's seat, a supporting member rotatable within said sleeve about a vertical axis, a driving train connecting said supporting member with the steering mechanism to cause rotation of said member when the steering mechanism is operated to swing the steering wheels, a pilot lamp structure on said supporting member, and a releasable driving connection between said lamp structure and supporting member for coupling the lamp structure thereto for automatic control by the steering mechanism and for releasing the lamp structure for manual control independently of the steering mechanism.

2. The combination with the body, steering wheels and steering mechanism of a motor vehicle, of a vertically extending sleeve secured to the frame adjacent the driver's seat, a supporting member journaled within said sleeve for rotation around a longitudinal axis, a driving train connecting said supporting member with the steering mechanism whereby said supporting member will turn about its axis during operation of the steering mechanism to swing the steering wheels, a pilot lamp structure, a yielding connection normally locking the lamp structure to said supporting member to cause the lamp structure to turn therewith during operation of the steering mechanism, and means for releasing said connection to permit turning of the lamp structure on said supporting member independently thereof.

3. The combination with the body, steering wheels and steering mechanism of a motor vehicle, of a frame adjustably secured to said body adjacent the driver's seat, a supporting member journaled in said frame to rotate about its vertical axis, a driving train connected with said supporting member and having adjustable connection with the steering mechanism whereby said member will be rotated about its axis when the steering wheels are swung by the steering mechanism, a pilot lamp structure confined on said supporting member, detent and groove connection between said lamp structure and supporting member operable normally to lock the lamp structure to the supporting member and adapted to be actuated to release the lamp structure for manual operation independently of the steering mechanism.

4. The combination with the body, steering wheels and steering mechanism of a motor vehicle, of a bearing frame secured to said body adjacent the driver's seat, a supporting member journaled to rotate in said frame, a driving train connecting said supporting member with the steering mechanism whereby to effect turning thereof when the steering mechanism is operated, a pilot lamp, a stem extending from said lamp into said supporting member and rotatable and longitudinally shiftable therein, an abutment on said stem, and a spring tending to force said abutment against said supporting member to cause the stem and lamp to turn with said supporting member, said spring permitting manual separation of said abutment from said supporting member whereby said lamp may be turned independently of said supporting member and steering mechanism.

In witness whereof I hereunto subscribe my name this 11th day of January, A. D., 1916.

CLIFFORD V. BATES.